United States Patent [19]
Frost

[11] Patent Number: 5,564,744
[45] Date of Patent: Oct. 15, 1996

[54] ENERGY ABSORBENT INTERIOR TRIM FOR VEHICLE

[75] Inventor: Colin Frost, Dover, N.H.

[73] Assignee: Davidson Textron Inc., Dover, N.H.

[21] Appl. No.: 521,448

[22] Filed: Aug. 30, 1995

[51] Int. Cl.$^6$ .......................... B60R 21/04; B60R 21/055
[52] U.S. Cl. ............................................ 280/751; 296/189
[58] Field of Search ............................. 280/751; 296/189

[56] References Cited

U.S. PATENT DOCUMENTS

| | | | |
|---|---|---|---|
| 3,539,201 | 11/1970 | Loew | 280/751 |
| 3,779,595 | 12/1973 | Suzuki et al. | 296/28 |
| 3,797,857 | 3/1974 | Reeves | 280/751 |
| 3,904,223 | 9/1975 | Wilfert et al. | 280/751 |
| 5,163,730 | 11/1992 | Welch | 296/189 |

OTHER PUBLICATIONS

J. C. Whitney catalog No. 563J, Feb. 1, 1994, p. 93, "Stick–on Weatherstrip", part Number 15–0578Y.

*Primary Examiner*—Kenneth R. Rice
*Attorney, Agent, or Firm*—Reising, Ethington, Barnard & Perry

[57] ABSTRACT

A trim assembly for a vehicle providing energy absorption between a structural member and a trim cover has a curved cover including a curved inner surface supporting an energy absorbing tube having a first side portion thereon that has an undeformed position and a deformed position that is permanently plasticly deformed upon the cover initially being impacted and the energy absorbing tube has a first segment thereon with an undeformed curvature substantially fully engaged with the curved inner surface of the cover and further having a second side portion overlying the curved segment to form a leaf spring action therebetween that will absorb energy by elastic deformation upon plastic deformation of the first side portion as the cover is impacted.

16 Claims, 4 Drawing Sheets

U.S. Patent     Oct. 15, 1996     Sheet 1 of 4     5,564,744
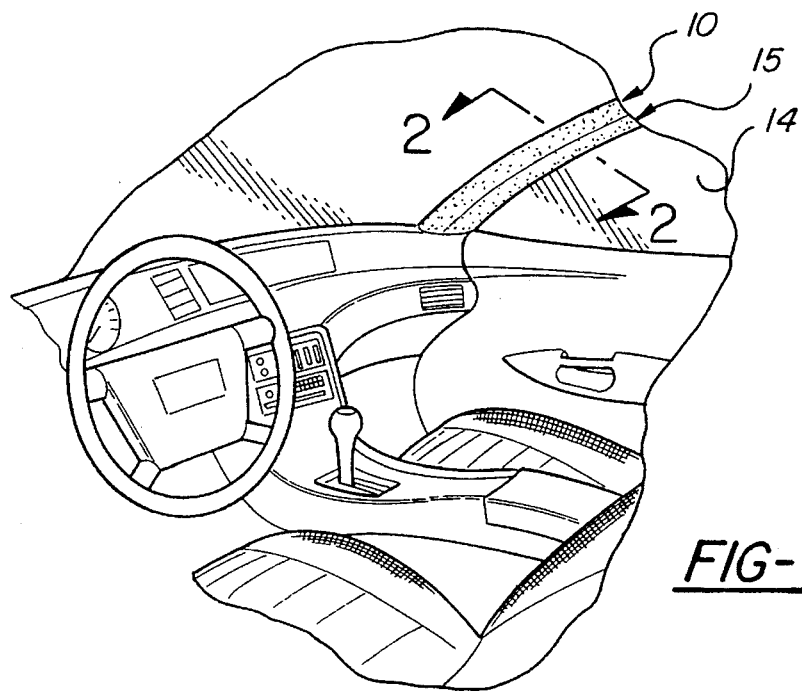
FIG-1
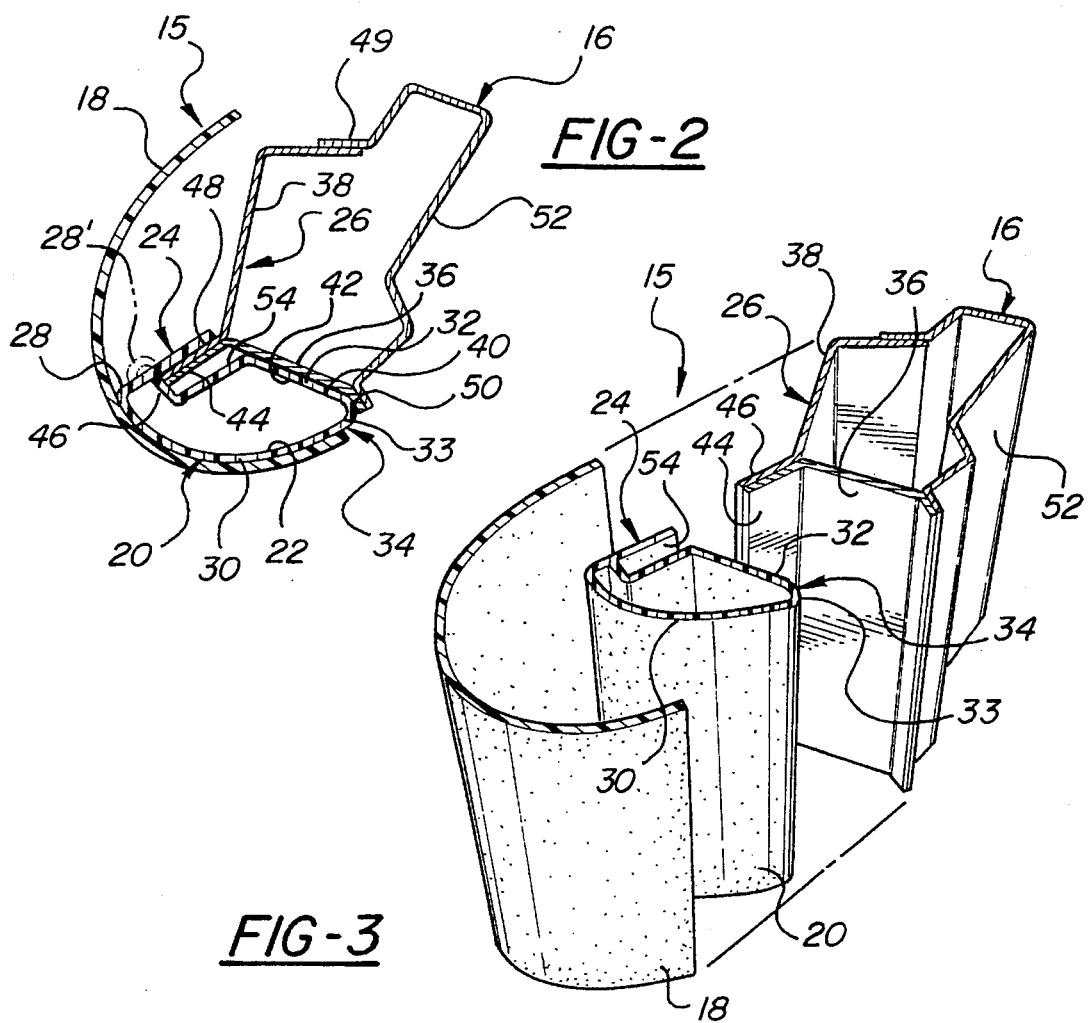
FIG-2
FIG-3

ENERGY ABSORBENT INTERIOR TRIM FOR VEHICLE

TECHNICAL FIELD

This invention relates to trim assembly for a vehicle providing energy absorption between a structural member and a trim cover and more particularly to such trim assemblies for covering vehicle pillars or trim bars.

BACKGROUND OF THE INVENTION

Presently, interior trim molding used to cover most frame components of a vehicle, such as the fore and aft pillar posts, are made of hard injection molded plastic materials that define a decorative cover but do not respond to impact loading so as to absorb energy. Future Federal Safety Regulations are expected to require that such trim moldings be configured to absorb energy on impact to offer better impact protection to the occupants of the vehicle in the event of an accident.

Pillar post, side rails and other like parts of a vehicle structural are covered at the present time by polymeric injection molded parts that can be covered by decorative skins including fabrics. While such arrangements have an aesthetic appeal they do not provide controlled energy absorption of kinetic energy.

One proposal for such energy absorption is set-forth in U.S. Pat. No. 5,163,730 that includes a cover, a pillar and an interposed bracket that will buckle and deform to absorb kinetic energy. The arrangement requires the assembly of separate fasteners to connect an elastically deformable side portion of the bracket to a structural member.

Another trim cover is shown in U.S. Pat. No. 3,797,857 that discloses a multipiece trim strip with a molded PVC channel and a strip metal reinforcement that is attached to flanges of a windshield pillar or to a side rail. The trim strip is disclosed in embodiments of FIGS. 3 and 4 as having a resilient plastic pad located on the interior surface of the trim arrangement.

U.S. Pat. No. 3,779,595 discloses a cover arrangement for a center pillar or quarter pillar of a vehicle structural having inner and outer channel members forming the pillar. The pillar is covered by a trim panel that includes a substrate that is connected to the inner channel member by plasticly deformable support arms or a shock absorber plate.

While suitable for their intended purpose the prior art arrangements do not provide structure that includes integral portions thereon that are easily connected to vehicle structural members without the need for separate fasteners thereby to provide ease of assembly and precise location of an energy absorbing member prior to installation of a decorative cover member; further, none of the prior art arrangements provide the ability to control or tune the level of energy absorption for a given application.

SUMMARY OF THE INVENTION AND ADVANTAGES

The present invention addresses the problem of connection of a energy absorbing component in a trim component assembly having a structural member and a separate decorative cover member such that the energy absorbing component includes integral portions that eliminate the need for separate fasteners to secure it in place while providing staged energy absorption by buckling and elastic deformation.

In particular, an object of the present invention is to provide trim assembly for a vehicle providing energy absorption between a structural member and a trim cover having a generally curvilinear configuration with opposite ends thereon and including a curved inner surface and an energy absorbing member having a first side portion thereon that has an undeformed position and a plasticly deformed position. The first side portion is plastically buckled upon the cover being impacted. The energy absorbing member further includes a supported segment thereon with an undeformed curvature substantially fully engaged with the curved inner surface of the cover and further having a second side portion bent to overlie the supported segment in spaced relationship therewith to form an elastically deformable structure that will absorb energy by elastic deformation upon buckling of the first side portion as the cover is impacted and further characterized by having an integrally molded connector on the first side portion for mounting the energy absorbing member to the structural member.

A further object is to provide the aforesaid trim assembly for a vehicle providing energy absorption between a structural member and a trim cover in which the integrally molded connector comprises a pocket formed thereon secured to the structural member.

A still further object is to provide the aforesaid trim assembly for a vehicle providing energy absorption between a structural member and a trim cover in which the integrally molded connector is adhesively bonded to the structural member.

Another object is to provide the aforesaid trim assembly for a vehicle providing energy absorption between a structural member and a trim cover in which the energy absorbing member is shaped as a tube having an inboard portion formed at an acute angular relationship with the curved segment to form a leaf spring action therebetween and the structural member having a surface engageable with the inboard portion for producing a reaction between the structural member and the energy absorbing tube when the trim cover is impacted so as to cause the elastically deformable structure to flex in a leaf spring fashion to absorb energy by elastic deformation.

Yet another object of the invention is to provide the aforesaid trim assembly for a vehicle providing energy absorption between a structural member and a trim cover in which the energy absorbing member has a free end that coils during elastic deformation of the energy absorbing member to absorb energy by winding action.

Still another object of the invention is to provide the aforesaid trim assembly for a vehicle providing energy absorption between a structural member and a trim cover wherein the energy absorbing member is formed with a plurality of slots thereon for tuning the elastic deformation of the energy absorbing tube.

THE DRAWINGS

Presently preferred embodiments of the present invention are disclosed in the following description and the accompanying drawings, wherein:

FIG. 1 is a fragmentary perspective view of a passenger compartment of an automotive vehicle showing a trim assembly of the present invention covering a front pillar post;

FIG. 2 is an enlarged sectional view taken along the line 2—2 of FIG. 1 looking in the direction of the arrows;

FIG. 3 is an exploded, partly broken, perspective view of the trim assembly shown in FIGS. 1 and 2;

DETAILED DESCRIPTION

Figure 4:
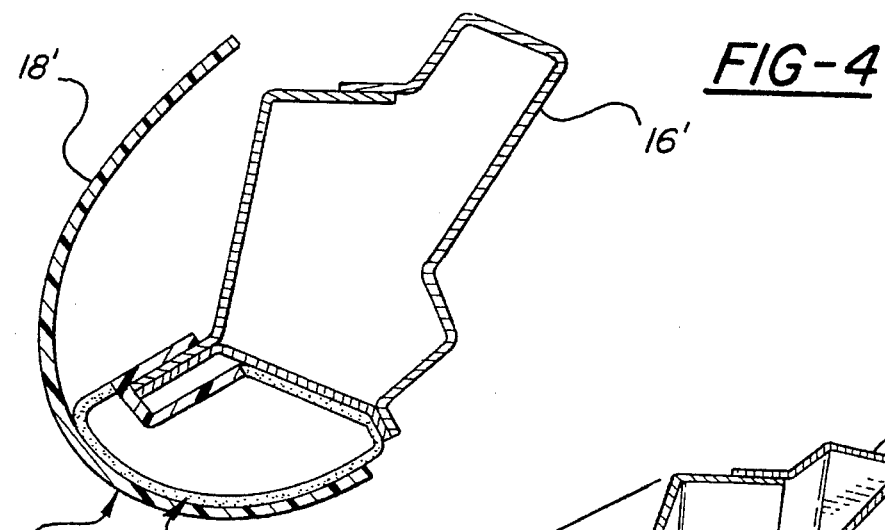
FIG. 4 is a enlarged sectional view showing another embodiment of the present invention.

FIG. 1 illustrates a passenger compartment of an automotive vehicle 10 in which a frame 12 of the vehicle is shown extending about an adjacent window 14 and including a trim assembly 15 constructed according to the present invention.

In the illustrated arrangement the trim assembly 15 is associated with the upright front or A pillar 16 of the vehicle with it being understood that the invention is suitable for side rail components of the interior trim of a vehicle including but not limited to the window frame components and the upright back or B pillar portion of the frame and interconnecting roof structure rails that extend between the upper ends of the A and B pillar portions all of which components are well known to those skilled in the art as including structural sections that will provide desired support and rigidity to the structural sections of a motor vehicle.

In the illustrated embodiment the trim assembly 15 has the same general shape and configuration as the front A pillar 16 on which it is mounted and in the illustrated embodiment the trim assembly 15 includes a decorative cover 18 that is associated with an energy absorbing member 20 that can be either molded integrally of or adhesively connected to the inner surface 22 of the cover 18 in a manner to be described. In accordance with one principle of the present invention, the energy absorbing member 20 includes an integrally molded connector 24 that is friction fit, snap fit or adhesively bonded to structural member 26.

In the embodiment of FIGS. 2 and 3, the energy absorbing member 20 includes a side portion 28 that extends generally perpendicularly to the tangent line at the side edge of a curved segment 30. The curved segment 30 of the energy absorbing member 20 is supportingly engaged by the inner surface 22 as best shown in FIG. 2 and can be molded integrally of the member 20 or can be a separate molded part connected thereto by a suitable layer of adhesive not shown. The energy absorbing member 20 further includes a reversely bent side portion 32 that extends from the curved segment 30 at an acute angular relationship therewith to form a bend 33 in a leaf spring 34 defined by the segment 30, the side portion 32 and the bend 33.

The energy absorbing member 20 is supported on the structural member 26 at flanged members 36, 38 thereof. The leaf spring 34 is supported at a surface portion 40 thereof on a supporting surface portion 42 on the flanged member 36. Flanges 44, 46 on the flanged members 36, 38 are joined at 48 by suitable fasteners such as spot welding. The opposite ends 49, 50 of the flanged members 36, 38 are connected to a hollow shaped structural member 52 of the pillar 16. The shape of the structural member 26 and the structural member 52 depends upon the particular structural structure employed in the frame work of a given vehicle structural design. In accordance with the invention, the integrally molded connector 24 is configured to form a connection between the structural member 26 and the trim assembly 15. In the embodiment of FIGS. 1–3, the integral connector 24 is formed as a U-shaped pocket 54 that is frictionally engaged to; snap fit or adhesively bonded to the forwardly projecting joined flanges 44, 46.

The trim assembly can be manufactured in many ways though in the illustrated embodiments it is contemplated that the decorative cover 18 and energy absorbing member 20 be molded either as a module or as separate parts that are then adhered together. The materials of the cover 18 can be plastic or metal and/or a laminate of the cover 18 and a suitable decorative fabric or other decorative material; the energy absorbing member 20 can be molded from plastic or shaped as a metal part. The structural members 26, 52 can be of any suitable material though metal is typically used. The aforedescribed energy absorbing member 20 enables the parts to be assembled without use of separate fasteners.

In operation, impact is absorbed by the trim assembly 15 in a manner to reduce acceleration by the following sequence. Initially, the energy absorbing member 20 is undeformed as shown in FIG. 2. Upon initial impact the side portion 28 buckles by plastic deformation as shown in outline at 28' in FIG. 2 to permanently absorb a component of the kinetic energy of the impact. Further impact is elastically absorbed by the leaf spring 34 as the curved segment 30 and reversely bent and acutely angularly configured side portion 32 are sprung together to absorb additional energy by elastic spring action during impact so as to absorb further kinetic energy by controlled elastic deformation within the limits of known leaf spring design. The operation of the trim assembly 15 is to absorb kinetic energy both plastically and elastically in a sequenced and controlled manner so as to reduce the magnitude of acceleration and thereby protect the vehicle passengers.

Figure 5:
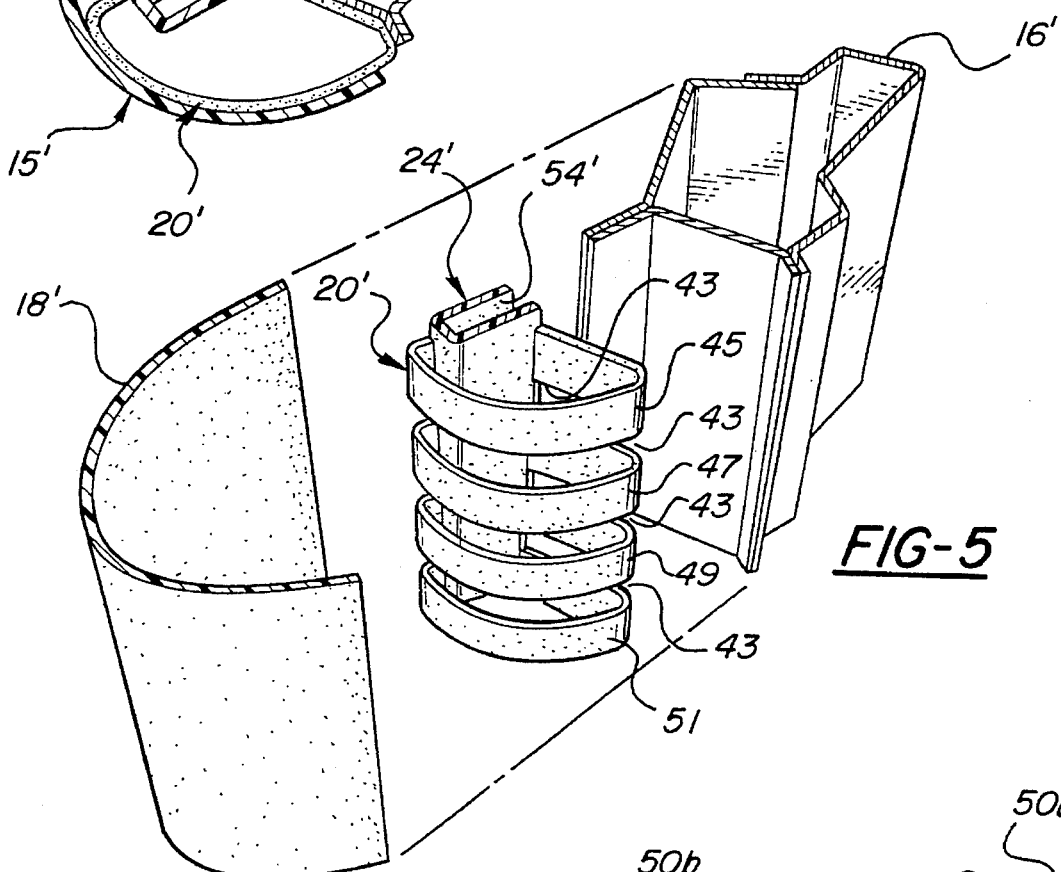
FIG. 5 is an exploded, partly broken, perspective view of the trim assembly shown in FIG. 4.

In the embodiment of FIGS. 4 and 5 like components to those shown in the first embodiment carry the same reference numerals primed. In this embodiment the energy absorbing member 20' is modified to have a plurality of axially spaced slots 43 that are selected to define a plurality of separate, spaced, leaf springs four of which are shown at 45, 47, 49, 51. The number of separate leaf springs will depend upon the length of a structural part that is to be protected against impact. The leaf spring are selected in number and in size to produce a desired tuned spring force up and down or across a given trim assembly depending upon what part of a structural member it shields from impact. Each of the springs 45, 47, 49, 51 have their opposite ends connected to the integral connector 24' as best shown in FIG. 5. The other parts of the trim assembly 15' shown in the embodiments are like those shown in the embodiment of FIGS. 2 and 3 are formed of like material, formed and/or assembled in a like manner for functioning in a like manner. In the case of the leaf springs 45, 47, 49, 51, it will be understood that the spring force and resultant absorption of kinetic energy by bending will be established by the leaf springs that are compressed in response to impact therewith whereas in the first embodiment the full length of the leaf spring 34 will come into play to a greater or lesser degree.

Figure 5A:
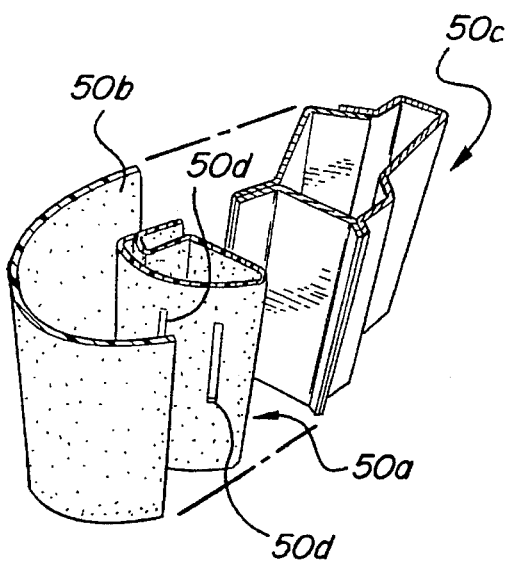
FIG. 5A is an exploded, partly broken, perspective view of another embodiment of the trim assembly shown in FIG. 4.

In the embodiment of FIG. 5A a leaf spring 50a is shown that is arranged with respect to a cover 50b and a pillar 50c to function in the same manner as the leaf springs in the prior embodiments. In this embodiment, the leaf spring 50a has a plurality of longitudinally directed, laterally spaced slots 50d selected in number, sized and arranged to provide desired tuning of the spring action for a given application.

Figure 6:
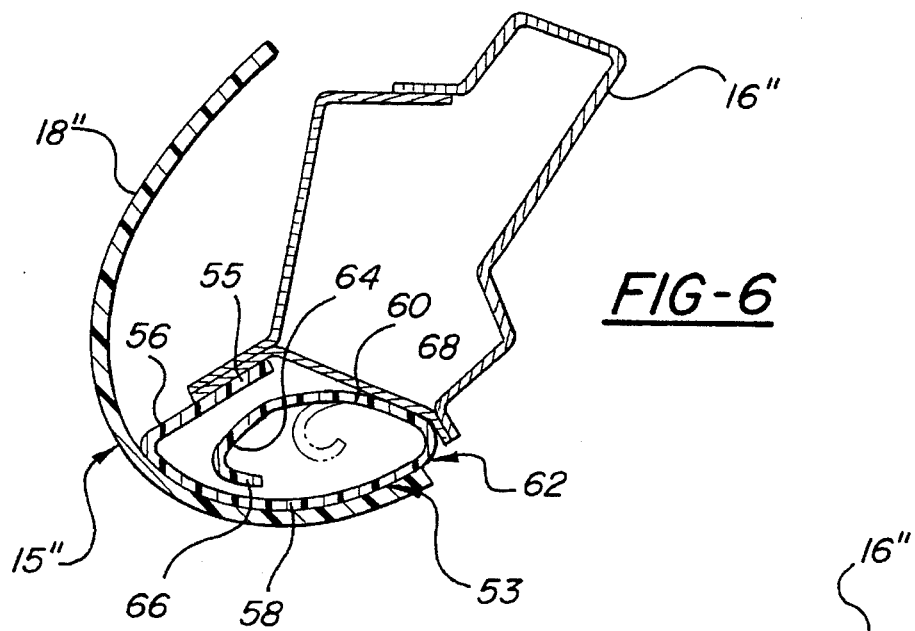
FIG. 6 is an enlarged sectional view showing another embodiment of the present invention.
Figure 7:
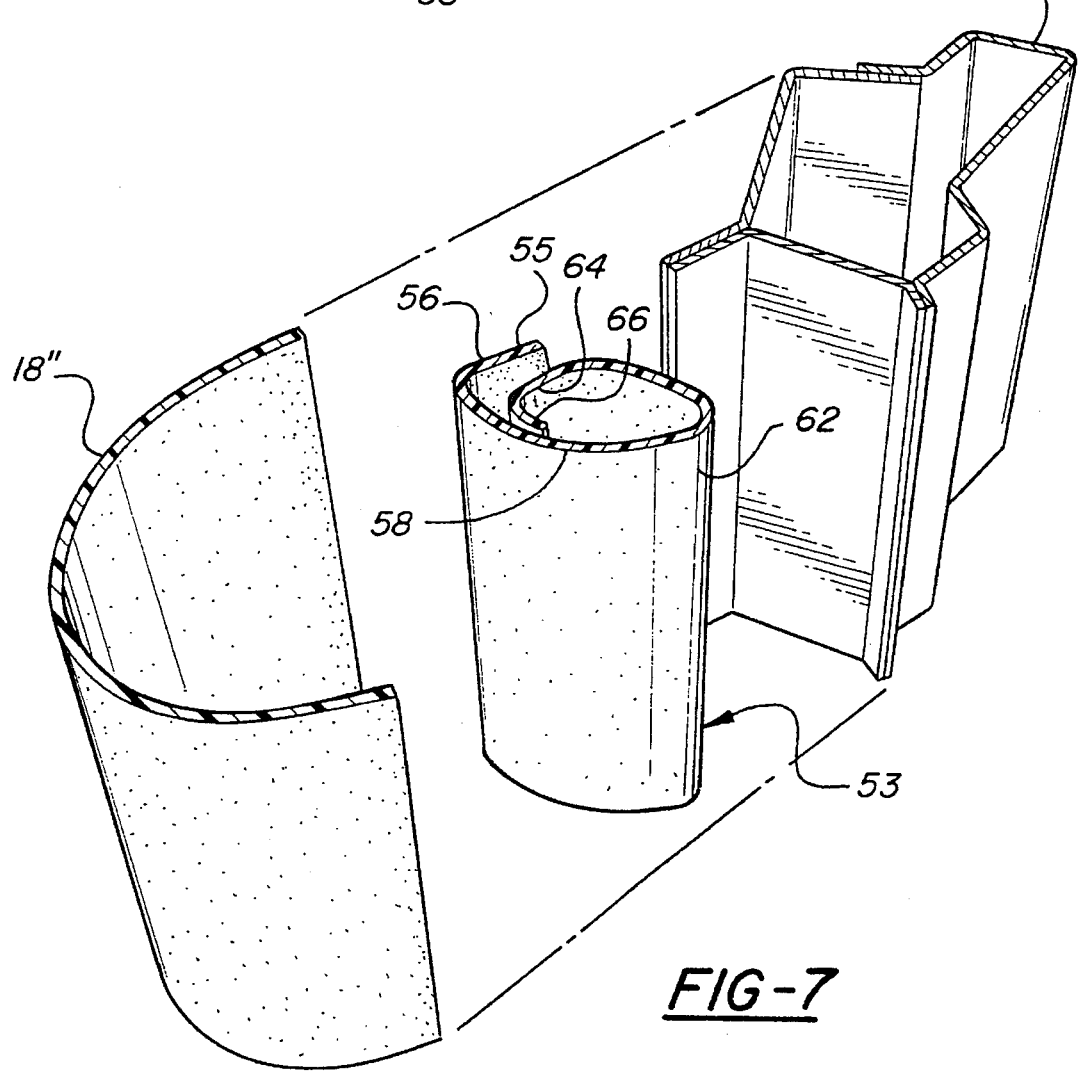
FIG. 7 is an exploded, partly broken, perspective view of the trim assembly shown in FIG. 6.

The embodiment of the invention shown in FIGS. 6 and 7 includes a cover and structural part like those in the prior embodiments identified with like reference numerals double primed. The energy absorbing member 53 in this embodiment is a tube like member that has a connector 55 formed on one end thereof at a side portion 56 that is generally perpendicularly formed with respect to the end of a curved segment 58 like curved segment 30 of the FIGS. 2 and 3 embodiment. In this embodiment the curved segment 58 is integrally molded with the cover 18" or is adhesively connected thereto. The curved segment includes a reversely bent segment 60 forming a leaf spring 62. In this embodiment, the leaf spring 62 has a free end 64 that is bent over at 66 to form a coil like structure. In this embodiment the component parts can be made of the same materials as discussed in the first embodiment. The manner of assembly is the same. Operation differs in that the side portion will deform plastically and the spring 62 will absorb energy by bending and additionally, energy will be absorbed by the coil like structure winding up as shown in outline at 68 in FIG. 6.

Figure 8:
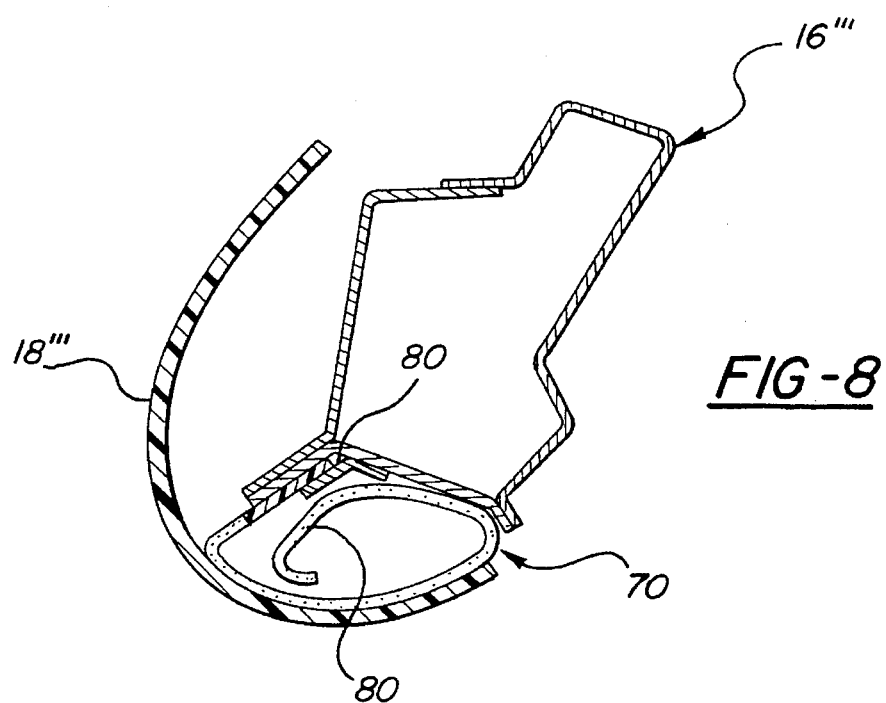
FIG. 8 is an enlarged sectional view showing another embodiment of the present invention.
Figure 9:
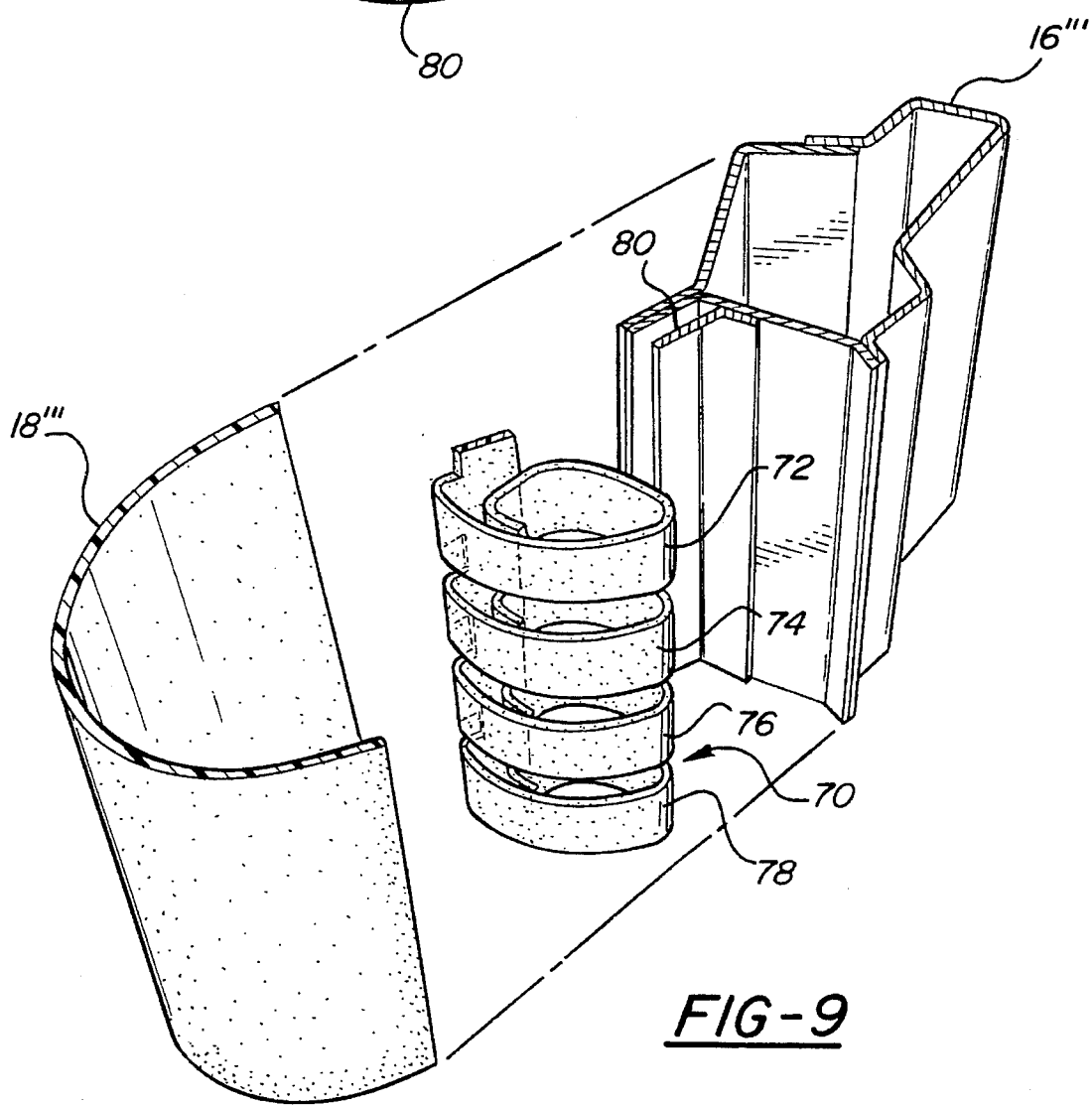
FIG. 9 is an exploded, partly broken, perspective view of the trim assembly shown in FIG. 8.

The embodiment of FIGS. 8 and 9 are like those shown in the prior embodiments, modified to combine various aspects thereof. In this embodiment like parts to those in the embodiment of FIGS. 1–3 are identified with like reference numerals triple primed. An energy absorbing member 70 is shown having a plurality of leaf spring components four of which are shown at 72, 74, 76 and 78. Each of the spring components has a free, bent end 80 that defines a coil like structure that will absorb energy by bending and wind-up thereby to combine the kinetic energy absorption functions of the embodiments of FIGS. 4–5 and FIGS. 6–7.

While the pocket connector is shown on the energy absorber in the embodiments of FIGS. 2–3, 4–5 and 6,7 it can be formed on the structural member as shown at 80 in FIG. 9 in which case the connection can be friction fit, snap fit or adhesively bonded or equivalently fitted to the respective component for ease of assembly of the component parts of the trim assembly of the present invention.

The invention has been described in an illustrative manner, and it is to be understood that the terminology used herein is intended to be in the nature of words of description rather than of limitation. Obviously, one skilled in the art will appreciate that many modifications and variations of the present invention could be made in light of the above teachings without departing from the spirit of the invention. It is to be understood, therefore, that the invention may be practiced within the scope of the appended claims otherwise than as specifically described above.

What is claimed is:

1. A trim assembly for a vehicle providing energy absorption between a structural member and a trim cover and an energy absorbing member having a first side portion that is plastically buckled upon the cover being impacted and the energy absorbing member having a first segment thereon joined to a second side portion bent to form an elastically deformable structure that will absorb energy by elastic deformation upon buckling of said first side portion as the cover is impacted characterized by:

an edge portion connector integrally molded on said first side portion for self-mounting said energy absorbing member to said structural member in a manner to orient and control the deformation sequence of said energy absorbing member when installed in the vehicle such that in response to an applied impact load said first side portion is caused to buckle and plastically deform to absorb a portion of the impact energy and in response to such buckling of said first portion said elastically deformable structure is caused to deform elastically under continued loading to absorb additional impact energy.

2. A trim assembly for a vehicle providing energy absorption between a structural member and a trim cover as set-forth in claim 1 further comprising:

said edge portion connector comprising a pocket formed thereon press fit to said structural member for securing said energy absorbing tube to said structural member.

3. A trim assembly for a vehicle providing energy absorption between a structural member and a trim cover as set-forth in claim 1 further comprising:

said edge portion connector comprising a flat segment and adhesive connecting said flat segment to said structural member.

4. A trim assembly for a vehicle providing energy absorption between a structural member and a trim cover as set-forth in claim 1 further comprising:

said energy absorbing member shaped as a tube having an inboard portion formed at an acute angular relationship with said first segment to form a leaf spring action therebetween and said structural member having a surface engageable with said inboard portion for producing a reaction between said structural member and said energy absorbing member when said trim cover is impacted so as to cause said elastically deformable structure to absorb energy by elastic deformation upon plastic buckling deformation of said first side portion as the cover is impacted.

5. The trim assembly for a vehicle providing energy absorption between a structural member and a trim cover as set-forth in claim 1 further comprising:

said energy absorbing member having a free end that coils up during elastic deformation of said energy absorbing member to further absorb energy by elastic winding.

6. A trim assembly for a vehicle providing energy absorption between a structural member and a trim cover as set-forth in claim 1 wherein said energy absorbing member is formed with a plurality of slots for tuning the elastic deformation of said energy absorbing member.

7. The trim assembly of claim 6 further characterized by said slots being located at axially spaced points along the length of said energy absorbing member.

8. The trim assembly of claim 6 further characterized by said slots being located longitudinally along the length of said energy absorbing member.

9. A trim assembly for a vehicle providing energy absorption between a structural member and a trim cover as set-forth in claim 4 wherein said energy absorbing member is formed with a plurality of slots for tuning the elastic deformation of said energy absorbing member.

10. The trim assembly of claim 9 further characterized by said slots being located at axially spaced points along the length of said energy absorbing member.

11. The trim assembly of claim 9 further characterized by said slots being located longitudinally along the length of said energy absorbing member.

12. A trim assembly for a vehicle providing energy absorption between a structural member and a trim cover as set-forth in claim 5 wherein said energy absorbing member is formed with a plurality of slots thereon for tuning the elastic deformation of said energy absorbing member.

13. The trim assembly of claim 12 further characterized by said slots being located at axially spaced points along the length of said energy absorbing member.

14. The trim assembly of claim 12 further characterized by said slots being located longitudinally along the length of said energy absorbing member.

15. A trim assembly for a vehicle providing energy absorption between a structural member and a trim cover and an energy absorbing member having a first side portion that is plastically buckled upon the cover being impacted and the energy absorbing member having a first segment thereon joined to a second side portion bent to form an elastically deformable structure that will absorb energy by elastic deformation upon buckling of said first side portion as the cover is impacted characterized by:

an edge portion connector integrally molded on said first side portion for mounting said energy absorbing member to said structural member, said energy absorbing member having a free end that coils up during elastic deformation of said energy absorbing member to further absorb energy by elastic winding.

16. A trim assembly for a vehicle providing energy absorption between a structural member and a trim cover and an energy absorbing member having a first side portion that is plastically buckled upon the cover being impacted and the energy absorbing member having a first segment thereon joined to a second side portion bent to form an elastically deformable structure that will absorb energy by elastic deformation upon buckling of said first side portion as the cover is impacted characterized by:

an edge portion connector integrally molded on said first side portion for mounting said energy absorbing member to said structural member, wherein said energy absorbing member is formed with a plurality of slots for tuning the elastic deformation of said energy absorbing member.

* * * * *